United States Patent [19]

Yamada et al.

[11] Patent Number: 5,194,646

[45] Date of Patent: Mar. 16, 1993

[54] POLYMERIZABLE SILICONES HAVING ACETYLENIC UNSATURATION

[76] Inventors: Mitsuo Yamada, B-714, 45 Yamadaminami, Suita-shi, Osaka-fu; Hiroharu Ohsugi, 4-1-1-111 Nishimakino, Hirakata-shi, Osaka-fu; Ryuzo Mizuguchi, 42-6-301 Kurigatani Hashimoto, Yahata-shi, Kyoto-fu, all of Japan

[21] Appl. No.: 820,834

[22] Filed: Jan. 15, 1992

[30] Foreign Application Priority Data

Jan. 16, 1991 [JP] Japan .................................. 3-17004

[51] Int. Cl.$^5$ .......................... C07F 7/08; C07F 7/10
[52] U.S. Cl. .................... 556/420; 556/429; 556/437; 556/440
[58] Field of Search ................ 556/440, 437, 429, 420

[56] References Cited

U.S. PATENT DOCUMENTS 4,665,147  5/1982  Lieu et al. ..................... 556/440 X
4,882,451  11/1989  Yoshida et al. ................... 556/440

FOREIGN PATENT DOCUMENTS 1-108213  4/1989  Japan .

Primary Examiner—Paul F. Shaver
Attorney, Agent, or Firm—Sandler, Greenblum & Berstein

[57] ABSTRACT

A silicone compound of the rational formula:

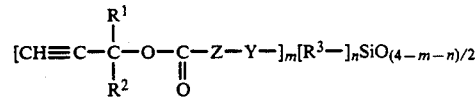

wherein $R^1$ and $R^2$ are independently a hydrogen atom or a hydrocarbon radical free from acetylenic unsaturaiton; Z is —O—, —S— or —NH—; Y is a divalent organic group; $R^3$ is a hydrogen atom, an akyl, alkenyl, alkoxy or phenyl group; and m and n are rational numbers satisfy the ration of $4 > m + n \geq 2$. The compound is useful as a precursor of nonemanating, self-curing and heat resistant silicone resins.

9 Claims, No Drawings

POLYMERIZABLE SILICONES HAVING ACETYLENIC UNSATURATION

BACKGROUND OF THE INVENTION

This invention relates to a novel silicon compound having a self-reactive acetylenic function which is useful as a precursor of self-curing, nonemanating resin compositions.

Siloxane compounds are well-known in the art as a precursor of silicone resins having heat resistant, water-resistant, anti-weathering and other benefical properties including electrical characteristics.

It is also well-known that certain compounds having an acetylenic function may be polymerize into polymers having a conjugated diene system through cleaving the acetylenic function. Because of the unique polymerization mechanism and the unique electrical and physical properties of their polymers, such compounds are attracting a great interest in the paint and electronic industry as a precursor of self-curable, nonemanating resins. Japanese Patent Kokai No. 108213/89, for example, discloses a propargyl ether of cresol-novolac resin as one of such compounds.

The present invention provides a novel class of silicone resin precursors which are polymerizable through acetylenic function into a modified silicone resin having excellent heat-resistance, water-resistance, weatherability, electrical and other properties.

SUMMARY OF THE INVENTION

In one aspect, the present invention provides a silicone compound of the rational formula I:

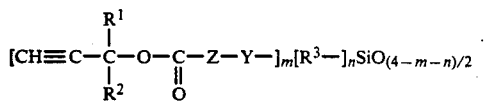

wherein $R^1$ and $R^2$ are independently a hydrogen atom or a hydrocarbon radical free from acetylenic unsaturation; Z is —O—, —S— or —NH—; Y is a divalent organic group; $R^3$ is a hydrogen atom, an alkyl, alkenyl, alkoxy or phenyl group; and m and n ar rational numbers satisfying the relation of $4 > m+n \geq 2$.

The present invention also provides a method for preparing the silicone compound of the rational formula I which comprises reacting a compound of the rational formula II:

$$[H-Z-Y-]_m[R^3-]_nSiO_{(4-m-n)/2} \quad (II)$$

wherein Z, Y, $R^3$, m and n are as defined, with a chloroformate of the formula III:

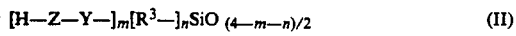

wherein $R^1$ and $R^2$ are as defined.

In another methodology aspect, the present invention provides a method for preparing the silicone compound of the rational formula I which comprises reacting a compound of the rational formula IV:

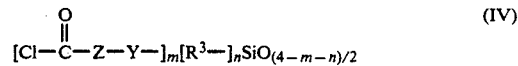

wherein Z, Y, $R^3$, m and n are as defined, with an alcohol of the formula V:

wherein $R^1$ and $R^2$ are as defined.

DETAILED DISCUSSION

The silicone resin precursor of the formula I of the present invention may be synthesized starting from a compound of the formula II and a 2-propinyl alcohol of the formula V. The synthesis is performed by reacting phosgene with either one of compounds II and V to form a corresponding chloroformate followed by the reaction of the chloroformate with the other one of compounds II and V.

Typical examples of the compound II are polydialkylsiloxanes having a hydroxyalkyl group attached to the silicon atom at both terminals (ZH=OH, Y=alkylene, $R^3$=alkyl). Other polysiloxane in which ZH is thiol or amino group, Y is an alkylene chain interrupted by —O— or —NH— linkage, and/or $R^3$ stands for a hydrogen atom, alkenyl, alkoxy or phenyl group may also be used. Polysiloxanes in which one or more HZ—Y— groups are attached to the silicon atom present in the middle of the polysiloxane chain may be used as well. The number average molecualre weight (Mn) of the starting polysiloxanes preferably ranges from 400 to 10,000. These polysiloxanes are commercially available from Shin-Etsu Chemical Co., Ltd., Tokyo (Shin-Etsu) or Toray Silicone Co., Ltd., Toky (Toray).

Typical examples of commercial products are listed below.

| Name | | |
|---|---|---|
| $[HO-CH_2CH_2CH_2-]_m[CH_3-]_nSiO_{(4-m-n)/2}$ | | |
| | OH number | Mn |
| X-22-160 AS | 112 | 1000 |
| KF-6001 | 62 | 1800 |
| KF-6002 | 35 | 3200 |
| $[H_2N-CH_2CH_2CH_2-]_m[CH_3-]_nSiO_{(4-m-n)/2}$ | | |
| | Amine equivalent | Mn |
| X-22-161 AS | 460 | 900 |
| X-22-161 A | 840 | 1680 |
| X-22-161 B | 1500 | 3000 |
| X-22-161 C | 1940 | 3880 |
| $[HS-CH_2CH_2CH_2-]_m[CH_3-]_nSiO_{(4-m-n)/2}$ | | |
| | | S content |
| X-22-980 | | 1.7% |
| $[H_2N-CH_2CH_2CH_2-$, or | | |
| $H_2N-CH_2CH_2CH_2-NH-CH_2CH_2CH_2-]_m$ | | |
| $[CH_3-$, or $CH_3O-]_nSiO_{(4-m-n)/2}$ | | |
| | | Amine equivalent |
| KF-393 | | 360 |
| KF-857 | | 830 |
| KF-860 | | 7600 |
| KF-861 | | 2000 |
| KF-862 | | 1900 |
| KF-864 | | 3800 |
| KF-865 | | 4400 |
| KF-867 | | 1700 |
| X-22-380 D | | 3800 |

| Name | |
|---|---|
| X-22-368 O | 8800 |
| X-22-3801 C | 3800 |

A typical example of 2-propinyl alcohols of the formula V is propargyl alcohol ($R_1=R_2=H$). Its α-monoalkyl ($R^1=H$, $R^2=C_1-C_{20}$ alkyl) or α, α-dialkyl ($R^1=R^2=C_1-C_{20}$ alkyl) derivatives may also be used.

Chloroformylation of siloxanes of the formula II or 2-propinyl alcohols of the formual V may be performed in per se known manner by reacting with a stoichiometric amount of phosgene.

The resulting chloroformate is then reacted with the other reactant which has not been chloroformated. This reaction is preferably performed in an inert solvent in the presence of an acid acceptor.

Examples of usable inert solvents incude DMSO, DMF, N-methylpyrrolidone, acetone, methyl ethyl ketone, methyl isobutyl ketone, benzene, toluene, xylene, diethyl ether, tetrahydrofuran, dioxane, methylene chloride, dichloroethane and the like. When the reaction system is not too viscous, the reaction may be performed without using the solvent.

Examples of acid acceptors include trimethylamine, triethylamine, pyridine, sodium hydroxide, potassium hydroxide, calcium hydroxide, magnesium hydroxide, sodium silicate, sodium aluminate, sodium carbonate, potassium carbonate, alkali metal ethoxide and the like. Tertiary amines and pyridine are preferred.

The reaction is preferably carried out under the nitrogen gas atmosphere to prevent coloration of the product. The reaction temperature may range from room temperature to the boiling point of the solvent used.

After the reaction, the product may be isolated and purified by the conventional technique such as extraction, recrystallization and the like.

The carbonate compounds thus prepared may be polymerized with a metallic catalyst or initiator, or by irradiating with actinic radiations such as UV radiation, gamma radiation or electron beam radiation. They are, therefore, useful as stock materials of resins used in paints, electric and electronic components, structural materials and nonlinear optical materials where nonemanating cure, and durability and heat resistance properties are desired in the finished products.

The invention is illustrated by the following examples wherein all parts and percents are by weight unless otherwise specified.

EXAMPLE 1

A flask equipped with a stirrer, thermoter, nitrogen gas tube and reflux condenser was charged with 20.0 g of KF-6001 (Shin-Ets) 50.0 g of methylene chloride and 4.50 g of trimethylamine. To the flask was added 5.20 g of propargyl chloroformate dropwise over one hour and the mixture was allowed to react for 6 hours at 30° C. After the reaction, the reaction mixture was treated with methylene chloride-water mixture and the organic phase was separated followed by drying over magnesium sulfate overnight. After filtering, the filtrate was evaporated in a rotary evaporator to obtain the product as described below. Yield was 63.6% of theory.

The structure of the product was identified by the IR spectrum and $^1$H-NMR (in $CDCl_3$, trimethylsilane standard).

STRUCTURE OF STARTING SILICONE

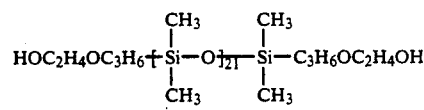

Structure of product

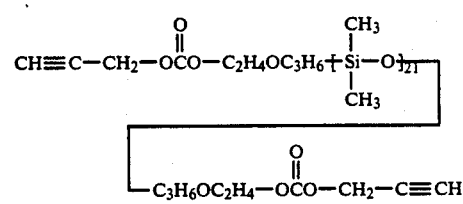

IR: $3300$ cm$^{-1}$, $2100$ cm$^{-1}$ ($CH \equiv C-$); $1750$ cm$^{-1}$

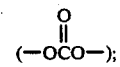

$1250$ cm$^{-1}$ ($\equiv Si-CH_3$); $1100-1040$ cm$^{-1}$ ($\equiv Si-O-$).
$^1$H-NMR, δ(ppm): $0.25$($\equiv Si-\underline{CH_3}$); $0.71$ ($\equiv Si-\underline{CH_2}$); $2.73$($\underline{CH} \equiv C-$); $4.94$($\equiv C-\underline{CH_2}$).

EXAMPLE 2

A flask equipped with a stirrer, thermeter, nitrogen gas tube and reflux condenser was charged with 18.0 g of X-22-161 AS (Shin-Etsu) 50.0 g of methylene chloride and 4.5 g of pyridine. To the flask was added 5.20 g of propargyl chloroformate dropwise over one hour and the mixture was allowed to react for 6 hours at 30° C. After the reaction, the reaction mixture was treated with mehylene chloride-water mixture and the organic phase was separated followed by drying over magnesium sulfate overnight. After filtering, the filtrate was evaporated in a rotary evaporator to obtain the product as described below. Yield was 68.5% of theory.

The structure of the product was identified by the IR spectrum and $^1$H-NMR (in $CDCl_3$, trimethylsilane standard).

STRUCTURE OF STARTING SILOXANE

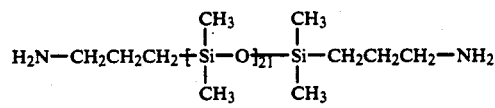

STRUCTURE OF PRODUCT

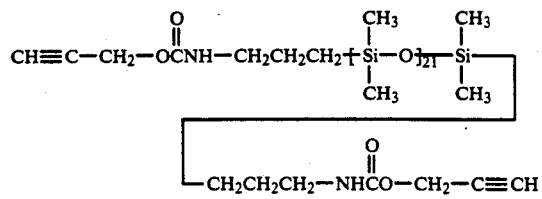

IR: $3300$ cm$^{-1}$, $2110$ cm$^{-1}$($CH \equiv C-$); $1760-1650$ cm$^{-1}$

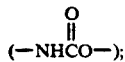

1260 cm$^{-1}$(≡Si—CH$_3$); 1100–1040 cm$^{-1}$ (Si—O—).

$^1$H-NMR, δ(ppm): 0.25(δSi—C<u>H</u>$_3$); 0.72 (≡Si—C<u>H</u>$_2$); 2.69(C<u>H</u>≡C—); 4.90 (≡C—C<u>H</u>$_2$).

The following products were produced by repeating Example 1 starting from appropriate starting siloxanes.

EXAMPLE 3

Structure of starting siloxane

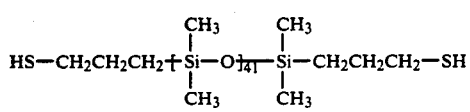

Structure of product

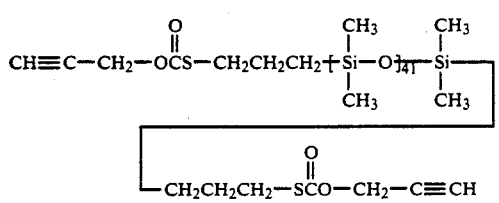

Yield = 37.3% of theory.

IR: 3300 cm$^{-1}$, 2110 cm$^{-1}$(CH≡C—); 1250 cm$^{-1}$ (≡Si—CH$_3$); 1100–1040 cm$^{-1}$(≡Si—O—).

$^1$H-NMR, δ(ppm): 0.23(≡Si—C<u>H</u>$_3$); 0.71 (≡Si—C<u>H</u>$_2$); 2.70(C<u>H</u>≡C—); 4.90 (≡C—C<u>H</u>$_2$—).

EXAMPLE 4

Structure of starting silicone

Structure of product

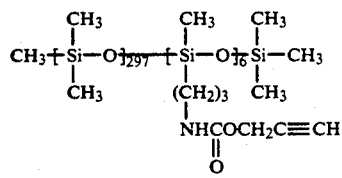

Yield = 77.0% of theory.

IR: 3300 cm$^{-1}$, 2110 cm$^{-1}$(CH≡C—); 1750–1650 cm$^{-1}$ (NHCO—), 1260 cm$^{-1}$(≡Si—CH$_3$); 1100–1040 cm$^{-1}$ (≡Si—O—).

$^1$H-NMR, δ(ppm): 0.25(≡Si—C<u>H</u>$_3$); 0.72(≡Si—C<u>H</u>$_2$); 2.70(C<u>H</u>≡C—); 4.91(≡C—C<u>H</u>$_2$—).

EXAMPLE 5

Structure of starting silicone

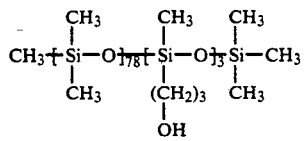

Structure of product

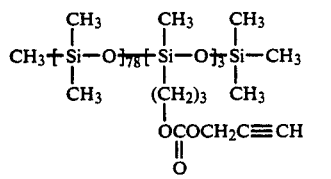

Yield = 52.0% of theory.

IR: 3300 cm$^{-1}$, 2100 cm$^{-1}$(CH≡C—); 1760 cm$^{-1}$

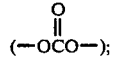
(—OCO—);

1245 cm$^{-1}$(≡Si—CH$_3$); 1100–1040 cm$^{-1}$ (≡Si—O—).

$^1$H-NMR, δ(ppm): 0.24 (≡Si—C<u>H</u>$_3$); 0.71 (≡Si—C<u>H</u>$_2$); 2.71(C<u>H</u>≡C—); 4.93(≡C—C<u>H</u>$_2$—)

EXAMPLE 6

Chloroformate of the starting silicone of Example 1 (chloroformate of KF-6001) was reacted with 2-methyl-3-butin-2-ol in the presence of trimethylamine and the product was analyzed.

Structure of Product

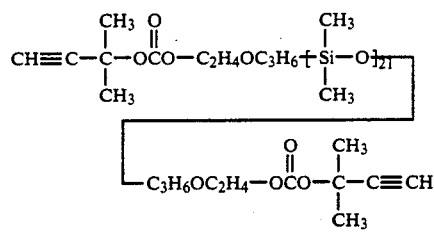

Yield = 50.2% of theory.

IR: 3300 cm$^{-1}$, 2100 cm$^{-1}$(CH≡C—); 1750 cm$^{-1}$

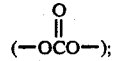
(—OCO—);

1250 cm$^{-1}$(≡Si—CH$_3$); 1100–1040 cm$^{-1}$ (≡Si—O—).

$^1$H-NMR, δ(ppm): 0.25(≡Si—C<u>H</u>$_3$); 0.71(≡Si—C<u>H</u>$_2$); 2.73(C<u>H</u>≡C—); 4.95(≡C—C<u>H</u>$_2$—).

We claim:

1. A compound of the rational formula:

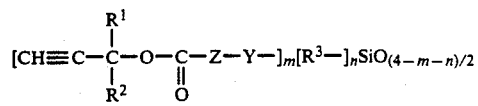

wherein $R^1$ and $R^2$ are independently a hydrogen atom or a hydrocarbon radical free from acetylenic unsaturation; Z is —O—, —S—, or —NH—; Y is a divalent organic group; $R^3$ is a hydrogen atom, or an alkyl, alkenyl, alkoxy or phenyl group; and m and n are rational numbers satisfying the relation of $4 > m+n \geq 2$.

2. The compound as claimed in claim 1 having a number average molecular weight from 400 to 10,000.

3. The compound as claimed in claim 2, wherein Z is —O—, Y is a lower alkylene, and $R^3$ is methyl.

4. The compound as claimed in claim 2, wherein $R^1$ and $R^2$ are each hydrogen atom.

5. The compound as claimed in claim 3, wherein $R^1$ and $R^2$ are each methyl.

6. The compound as claimed in claim 2, wherein $R^1$ and $R^2$ are each hydrogen atom, Z is —S—, Y is a lower alkylene, and $R^3$ is methyl.

7. The compound as claimed in claim 2, wherein $R^1$ and $R^2$ are each hydrogen atom, Z is —NH—, Y is a lower alkylene, and $R^3$ is methyl.

8. A method for preparing the compound of claim 1 which comprises reacting a compound of the rational formula:

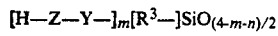

wherein Z, Y, $R^3$, m and n are as defined, with a chloroformate of the formula:

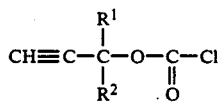

wherein $R^1$ and $R^2$ are as defined.

9. A method for producing the compound of claim 1 which comprises reacting a compound of the rational formula:

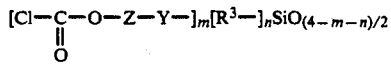

wherein Z, Y, $R^3$, m and n are as defined, with an alcohol of the formula:

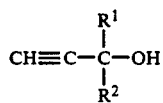

wherein $R^1$ and $R^2$ are as defined.

* * * * *

UNITED STATES PATENT AND TRADEMARK OFFICE
CERTIFICATE OF CORRECTION

PATENT NO. : 5,194,646
DATED : March 16, 1993
INVENTOR(S) : M. YAMADA et al.

It is certified that error appears in the above-indentified patent and that said Letters Patent is hereby corrected as shown below:

On the title page, item: [57], in the Abstract, line 10, change "akyl" to ---alkyl---.
On the title page, item: [57], in the Abstract, lines 8 and 9 change "unsaturaiton" to --- unsaturation ---.
At column 2, line 44, delete "Name".
At column 2, line 46, insert ---Name--- above "X-22-160 AS", which appears on line 47.
At column 2, line 51, insert ---Name--- above "X-22-161 AS", which appears on line 52.
At column 2, line 52, change "460" to ---450---.
At column 2, line 56, insert ---Name--- above "X-22-980", which appears on line 57.
At column 2, line 61, insert ---Name--- above "KF-393", which appears on line 62.
At column 3, line 3, insert ---Amine equivalent--- above "8800", which appears on line 4.
At column 3, line 56, change "Ets" to ---Etsu---.

Signed and Sealed this

Eleventh Day of October, 1994

Attest:

BRUCE LEHMAN

*Attesting Officer*     *Commissioner of Patents and Trademarks*